N. D. HINMAN.
Horse Hay Fork.
No. 49,405.  Patented Aug. 15, 1865.
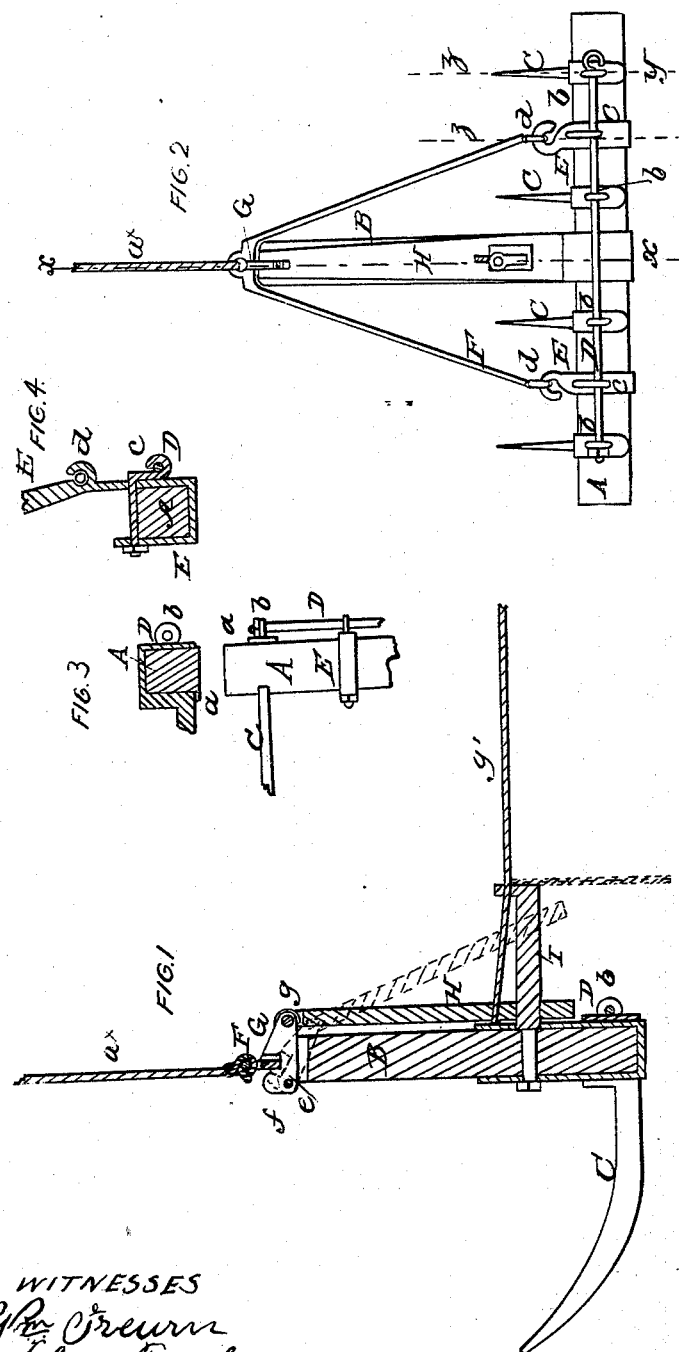

UNITED STATES PATENT OFFICE.

N. D. HINMAN, OF PLEASANT VALE, CONNECTICUT.

IMPROVEMENT IN HORSE HAY-FORKS.

Specification forming part of Letters Patent No. 49,405, dated August 15, 1865.

*To all whom it may concern:*

Be it known that I, N. D. HINMAN, of Pleasant Vale, in the county of New Haven and State of Connecticut, have invented a new and Improved Hay-Fork; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\,x$, Fig. 2; Fig. 2, a back view of the same; Fig. 3, a section of the same, taken in the line $y\,y$, Fig. 2; Fig. 4, a section of the same, taken in the line $z\,z$, Fig. 2; Fig. 5, an inverted plan or under view of a portion of the fork-head.

Similar letters of reference indicate like parts.

This invention relates to a new and improved hay-fork for elevating hay in barns by means of a horse; and it consists in a novel construction of the same, whereby the fork is rendered more durable than usual, the head of the fork not being weakened by the securing of the teeth or tines to it; and the invention further consists in a novel trip mechanism for enabling the fork to discharge its load, whereby the trip-rope is made to operate perfectly in any direction, either horizontally or vertically, thereby admitting of the fork being used in the ordinary way, or with a truck placed on ways in the upper part of the barn.

A represents the head of the fork, constructed of any suitable hard wood, and having a handle, B, framed into it at its center.

C represents the teeth or tines of the fork, which are curved in the usual way and have their rear ends bent to form three sides of a quadrangle to receive the fork-head, as shown in Fig. 3, the front side of said quadrangles fitting in grooves $a$ made in the front side of the fork-head. At the rear of each tooth or tine there is an eye, $b$, through which a rod, D, passes, said rod also passing through eyes $c$ at the rear ends of clips E, which are fitted on the fork-head, and to which the bail F of the fork is connected by hooks $d$, as shown clearly in Fig. 2. The rod D secures the teeth or tines on the fork-head, preventing them from slipping upward, as the clips E entirely encompass the fork-head, while the rear of the teeth or tines do not. (See Figs. 3 and 4.)

The handle B works within the bail F, and in the upper end of the former there is secured, by a pivot, $e$, a catch, G, formed of a plate having a notch, $f$, made in its upper edge. (See Fig. 1.) The outer end of this catch is connected by a pivot, $g$, with a bar, H, through the lower end of which an arm, I, passes loosely, said arm projecting from the handle B at right angles. The bar H is allowed to slide freely on this arm I, which serves as a means for operating the catch G, to enable it to hold the bail and to release the same. When the bar H is shoved up to the handle B the upper part of the bail is fitted in the notch $f$, and the fork is retained in a working position, so that it will hold its load while being elevated, and in order to enable the fork to disengage its load the lower end of the bar H is drawn outward by means of a rope or cord, $g'$, which is attached to it; and it will be seen that this rope or cord may be pulled either in a vertical, oblique, or horizontal direction, and it will actuate the bar H equally well. Hence the fork may be used in the ordinary way, or it may be connected with a truck on ways in the upper part of the barn, in order to move the fork, with its load, to the part where the latter is to be deposited, the rope or cord $g'$, in the latter case, passing over a pulley in the upper part of the barn, so that the rope will be pulled in a horizontal direction.

The fork is raised with a tackle, the rope $a^*$ of which is attached to the bail F, a horse being connected to the lower end of $a^*$, and all arranged in the ordinary way.

By having the teeth or tines attached to the fork-head, as shown, the latter is not weakened by having holes bored through it, and this plan possesses the advantage of admitting more or less teeth or tines being fitted on the fork-head, as the nature of the work may require. In some cases—as, for instance, when short hay is to be elevated—more teeth are required than when long hay is to be elevated.

Having thus described my invention, I claim as new and desire to secure by Letters Patent—

1. The securing or attaching of the teeth or tines to the fork-head by having the rear ends of the former made in the form of three sides of a quadrangle to receive the fork-head, the front sides of the quadrangles being fitted in grooves in the front side of the head, and the rear sides provided with eyes, through which and eyes at the rear of the clips to which the bail is attached a rod passes, substantially as herein described.

2. The catch G, bar H, and arm I, all arranged and applied to the handle B and in relation with the bail F, to operate substantially as set forth.

N. D. HINMAN.

Witnesses:
E. S. NORTON,
J W. GAYLOR.